United States Patent [19]

Rue

[11] 4,021,716
[45] May 3, 1977

[54] REACTIONLESS GIMBAL DRIVE SYSTEM

[75] Inventor: Arthur K. Rue, Palos Verdes, Calif.

[73] Assignee: Hughes Aircraft Company, Culver City, Calif.

[22] Filed: Dec. 23, 1974

[21] Appl. No.: 535,385

[52] U.S. Cl. .............................. 318/648; 318/689; 74/5.7; 235/150.2; 244/165; 74/5.34

[51] Int. Cl.² ........................................ B64L 17/02

[58] Field of Search .................. 318/648, 649, 689; 74/5.4, 5.5, 5.6, 5.7, 5.47, 5.34; 33/318; 244/165, 79; 235/150.2; 73/178 R

[56] References Cited

UNITED STATES PATENTS

| | | | |
|---|---|---|---|
| 3,111,290 | 11/1963 | Knowles | 244/165 |
| 3,329,375 | 7/1967 | Kurzhals et al. | 74/5.34 |
| 3,424,401 | 1/1969 | Maurer | 244/165 |
| 3,439,548 | 4/1969 | Horvath | 74/5.34 |
| 3,498,476 | 3/1970 | Mattson et al. | 74/5.34 |
| 3,526,795 | 9/1970 | Pecs | 244/165 |

Primary Examiner—Robert K. Schaefer
Assistant Examiner—John J. Feldhaus
Attorney, Agent, or Firm—M. E. Gerry; W. H. MacAllister

[57] ABSTRACT

A reactionless drive system is disclosed comprising in combination a base, a torquer mechanism, the stator portion of which is affixed to the counter-rotational inertia member and accepting control signals from sources external to the system. A rotatable member, coupled to the torquer, is driven in a first direction. A torque compensator consisting of stator and rotor members is coupled between the base and the first mentioned rotatable member in one instance, and to an oppositely rotating member in another instance. All the foregoing components act together to maintain angular momentum of the system during its operative mode to a value of substantially zero. An electronic subsystem is provided which senses the angular velocities of the rotating members and provides a feedback signal to the torque compensator.

11 Claims, 9 Drawing Figures

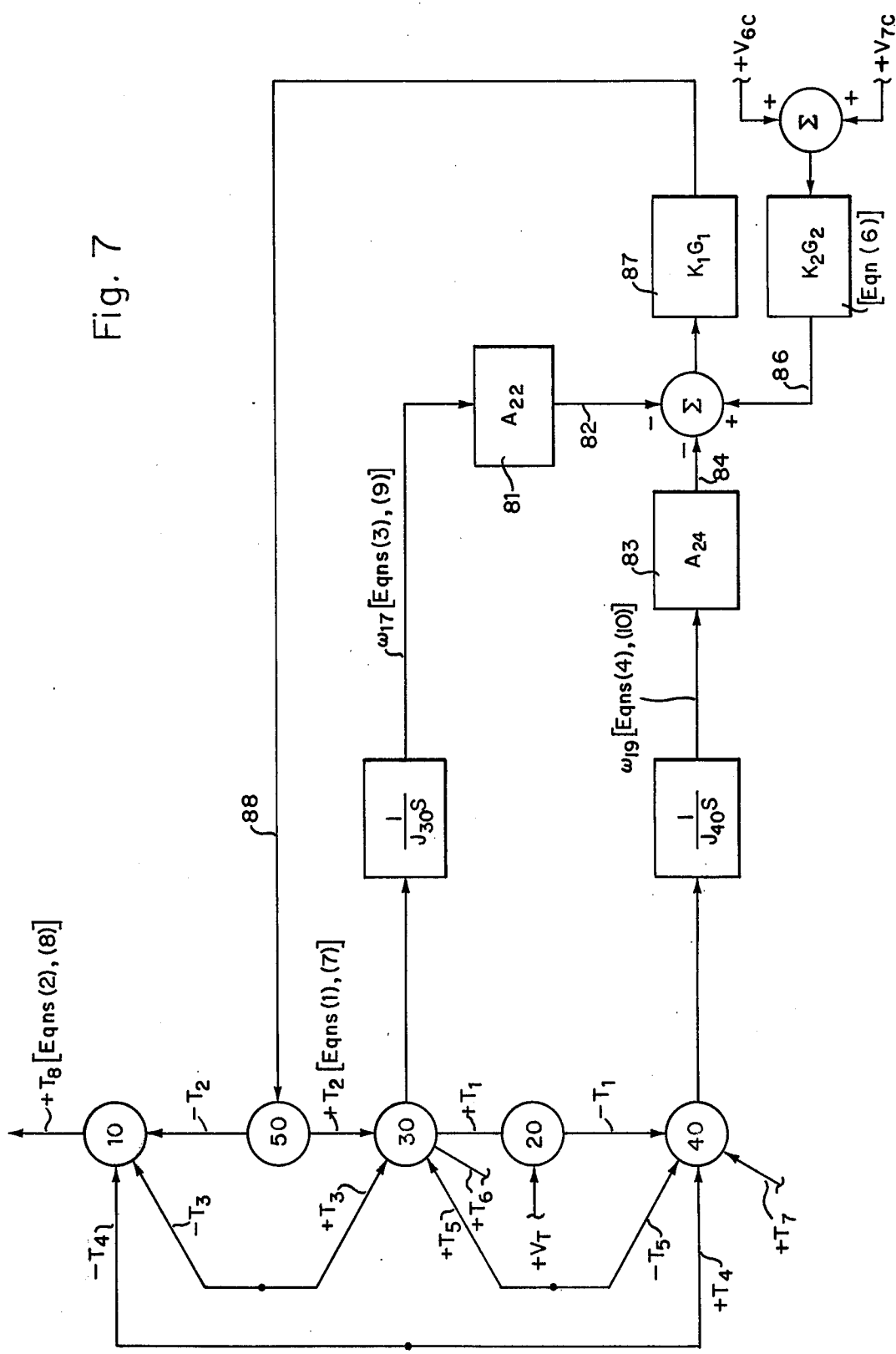

REACTIONLESS GIMBAL DRIVE SYSTEM

BACKGROUND OF THE INVENTION

This invention is in the field of rotating and counter rotating inertia members, or inertia gimbal drive systems.

Prior art systems employing counter rotating masses were deficient, in not being able to reduce the effective angular momentum of the system to substantially zero.

In systems employing gimbaled sensors, provision for angular scanning is generally required without introducing disturbance torques into the gimbal mounting base. Typically, momentum wheels or control moment gyros are utilized to implement the gimbal drives for these systems.

There are two particularly significant imperfections associated with such gimbal drives. Firstly, bias torques or coulomb friction and spring restraint torques that are present, ultimately give rise to angular momentum saturation of the drive thus limiting the operating time interval that can be realized before re-initiation is required. Secondly, the coulomb friction and spring restraint torques between various elements of the drive assembly are coupled to the mounting base thus producing uncompensated base disturbance torques.

SUMMARY OF THE INVENTION

It is therefore an objective of this system to provide means for compensating for reaction torques that would otherwise be transmitted to the base of the system.

Another objective of this invention is to compensate for residual torques inherent in the system by preventing momentum saturation due to a counter-rotating mass that might otherwise result due to dynamic biases in the system.

The instant reactionless drive concept is essentially a modification of the conventional momentum wheel drive concept in which an auxiliary drive torquer, angular rate sensors, and servo electronics are utilized to implement a compensation control loop which provides electrical error signals to the torque compensator and prevents drive momentum saturation and produces reaction torques at the mounting base that compensate for those that exist due to coulomb friction and spring restraint.

Depending on the application and the geometry of the gimbaling assembly, inertial kinematic torques which may also act on the reactionless drive rotating elements are considered. In these cases the torques of interest are deterministic and compensation control loop command inputs derived from the gimbaling assembly mass properties and measurements of the appropriate system angular rates, angular accelerations and linear accelerations are utilized to augment the basic reactionless drive implementation. If these command inputs are not implemented, inertial kinematic torques acting on the rotating elements of the drive and gimbaling assembly will be coupled to the mounting base by the action of the compensation control loop and the associated torquer.

Accordingly, a torquer responsive to external signal inputs drives a first rotational inertia member coupled to to the torquer in a first direction. A second and counter rotational inertia member is driven in opposite direction to the first direction, by the torquer. A torque compensator, having stationary and rotational elements, is coupled to either of the rotational and counter rotational inertia members for maintaining the total angular momentum of the system during its operative mode to a value of substantially zero.

Sensors are coupled to the rotational and counter rotational inertia members and constantly measure the angular velocities and accelerations of these members. The electrical outputs of the sensors are processed by electronic circuitry, the output of which is connected in circuit in a feedback loop as an input to the torque compensator, for enabling the system to provide error signals to the torque compensator and compensate for them in accordance with the system objectives outlined above.

BRIEF DESCRIPTION OF THE DRAWINGS

FIG. 7 is a torque schematic of the systems shown in FIG. 5 or FIG. 1.

DETAILED DESCRIPTION

Structural Relationships

Figure 1:
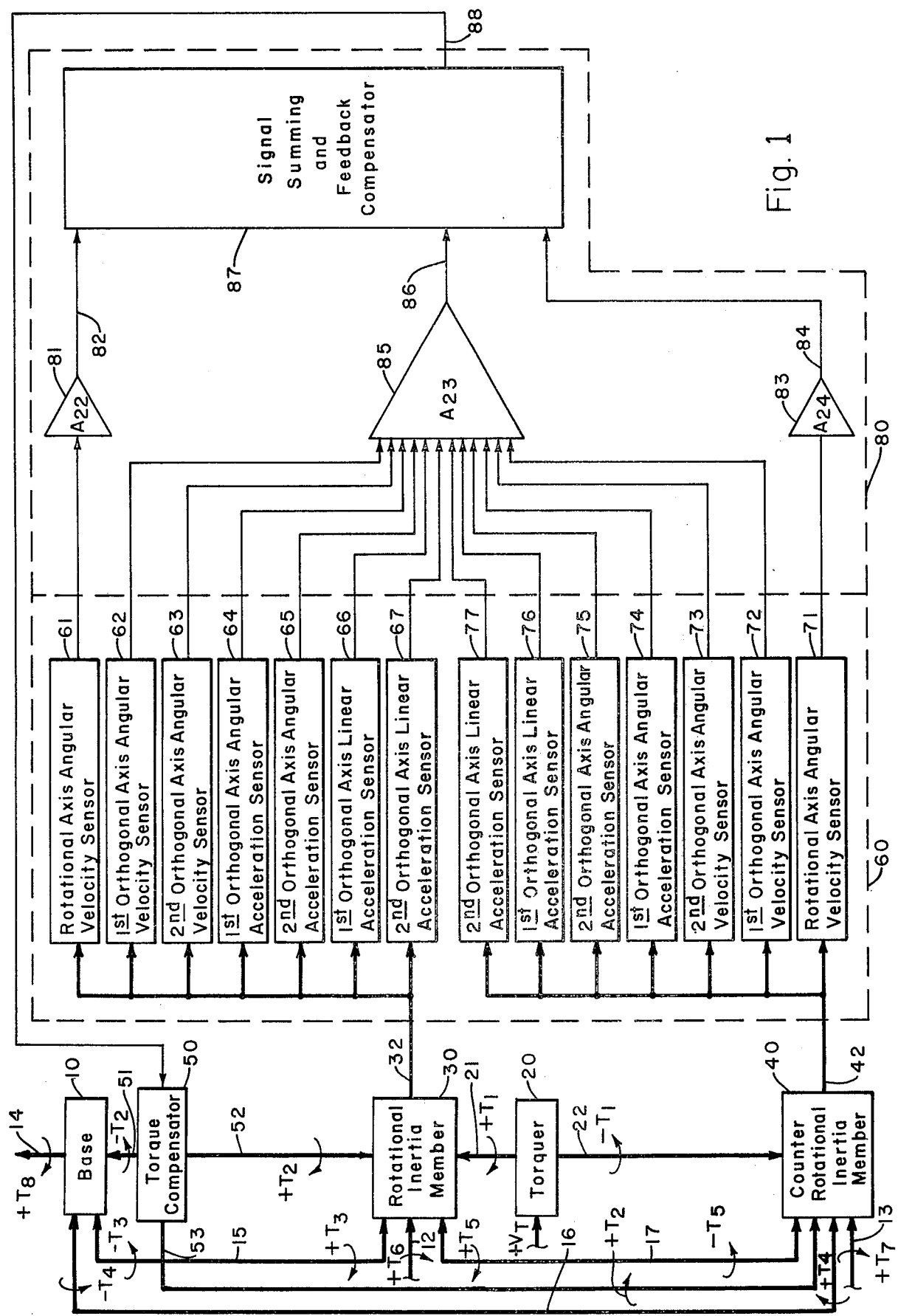
FIG. 1 is a torque and electronic schematic of the inventive system, showing in heavy lines the mechanical coupling of the several components therein and torques exerted thereupon, and in light lines the electrical connections between several of the components.

Referring to FIGS. 1, 2, 3, 4, 5, 6 and 8, a substantially reactionless drive system as encountered in gimbaled control systems is provided shown mounted on a structure as at 18.

The drive system is generally mounted in a base at 10. A torquer as at 20 responsive to external electrical signal inputs thereto is provided. This torquer may comprise an electrical motor structure having a stator as at 20' and a rotor member as at 20''. It is pointed out that although 20' is referred to as a stator member, member 20' actually is rotated with respect to rotor 20'' inasmuch as said member 20' is physically attached to counter rotational inertia member 40; of course rotor 20'' is also rotated by extension 31. Electrical interconnection to brushes in a communtator-type rotor or by slip rings between rotor and stator, where used, is conventional and need not be shown.

A single degree of freedom rotational inertia member 30 is provided with an elongated extension 31 perpendicular to the plane of rotation of member 30, and positioned at the axis of rotation of said member 30 and its extension 31. Extension 31 may be integral with or coupled to member 30.

Another single degree of freedom counter rotational inertia member 40 and coupled to the torquer is driven by the torquer in a direction opposite to member 30 in a plane generally parallel to the plane of member 30. Members 30, 31 and 40 are driven during the operative mode of the system.

A torque compensator as at 50 is generally coupled to the base. Compensator 50 has a stator 50' and rotor 50'', generally of similar configuration to the stator and rotor of the torquer.

Transducing means as at 60 provides conversion from velocities and accelerations of members 30 and 40 to electrical signals. Means 60 couples the torque compensator to electronic means as at 80 and provides electrical signal inputs, of the converted velocities and accelerations, to the electronic means.

Electronic means 80 has its output connected to the torque compensator providing error correction electrical signals thereto for enabling maintenance of a torque acting on the base or for maintaining the total angular momentum of the drive system during its operative mode to a value of substantially zero.

Figure 5:
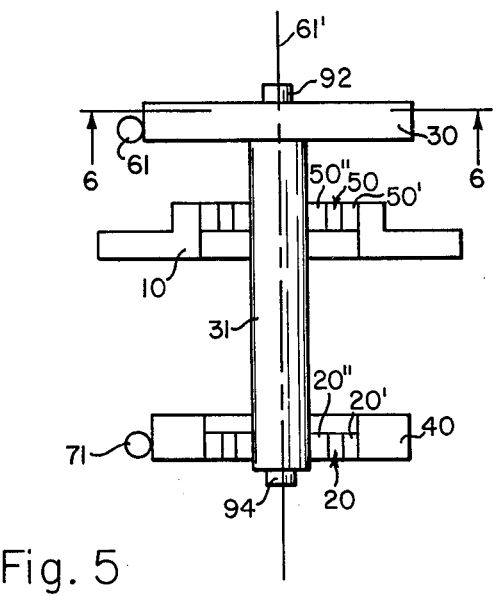
FIG. 5 is a structural schematic in elevation view of the structure of FIG. 2.
Figure 8:
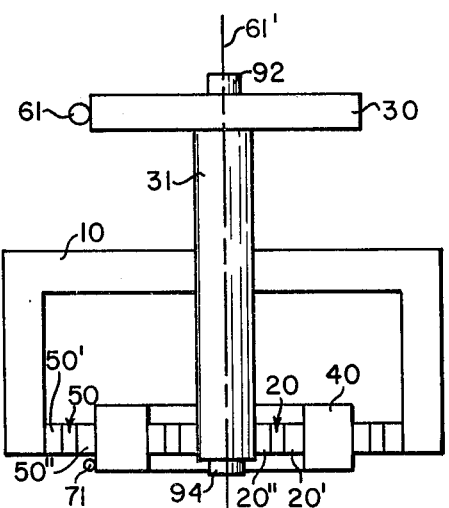
FIG. 8 is a structural schematic in elevation view of an alternate structure to that of FIG. 5.
Figure 3:
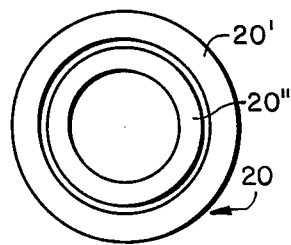
FIG. 3 is an elevation view of the stator and rotor members of the torquer as used in the system.
Figure 6:
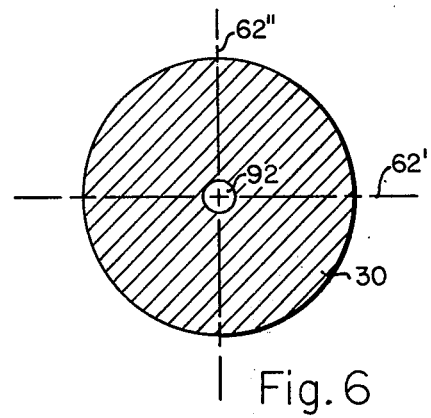
FIG. 6 is a cross-section view taken at plane 6—6 of FIG. 5 in order to show a pair of axes orthogonal to the rotational axis of the driven members of the system.
Figure 4:
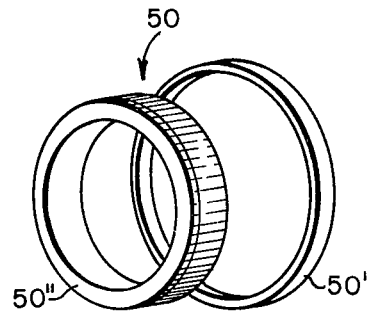
FIG. 4 is a perspective view of the stator and rotor members of the torque compensator as used in the system.

Two variations of the system are shown respectively in FIGS. 5 and 8. By specific reference to FIGS. 1 and 5, it may be seen that the rotor of the compensator is coupled to extension 31 and the stator is attached to base 10. On the other hand by reference to FIGS. 1 and 8, it may be seen that the rotor of the compensator is coupled to counter rotational inertia member and the stator thereof is attached to the base. The compensation torques produced, by virtue of the FIGS. 1 and 5 situation, is generally denoted as $+T_2$ at 52 in FIG. 1 as acting upon the rotational inertia member inasmuch as it is difficult to show schematically such torques acting upon extension 31. However, due to the coupling of extension 31 to member 30, such schematic notation correctly reflects the torque compensation situation. In FIGS. 1 and 8 configuration, the torque compensation at 52 will not be present, and in its stead compensation torque $+T_2$ at 53 acting on member 40 will prevail.

As to other torques in the drive system, in general FIG. 1 will show torque $-T_2$ at 51 imposed by the torque compensator upon base 10, and torque $+T_8$ imposed by base 10 upon external structure such as 18 to which the base is attached. At 15, a torque $+T_3$ will act upon rotational inertia member 30, and a torque $-T_3$ upon base 10. At 16 a torque $+T_4$ will act upon counter rotational inertia member 40, and a torque $-T_4$ upon base 10. At 17 a torque $+T_5$ will act upon rotational inertia member 30, and a torque $-T_5$ will act upon counter rotational inertia member 40. External torques will be imposed upon the drive system and forces due to such external torques will act upon such structures to which the drive system is attached. Such external torques will be present at 12 symbolized by notation $+T_6$, imposed upon rotational inertia member 30. Likewise torque $+T_7$ will be imposed upon counter rotational inertia member 40 at 13.

Additionally, torquer 20 will provide torque $+T_1$ at 21 upon rotational inertia member 30, and torque $-T_1$ at 22 upon counter rotational inertia member 40.

An electrical signal $+V_T$ defined in the table of symbols and definitions, below, is provided, by the vehicle being stabilized by the instant drive system, as an input to torquer 20 to drive same during operational mode of the drive system.

Velocities and accelerations of rotational members 30 and 40 will be respectively sensed at 32 and 42 by means of sensors or transducers, well known in the art and require no explanation of their designs. These sensors are composed of sensor group 61–67 which are coupled to rotational inertia member 30 and sense the velocities and accelerations thereof. Likewise, sensor group 71–77, are coupled to counter rotational inertia member 40 and sense its velocities and accelerations.

Sensors 61 and 71 respectively positioned in conjunction with or contiguous to the peripheries of members 30 and 40, sense the rotational angular velocities of said members 30 and 40 about axis 61', and provide electrical outputs therefrom to amplifiers 81 and 83 respectively of electronic means 80. All components of electronics means 80 are well known in the art and need not be separately discussed.

Sensors 62–67 generally shown at 92 in FIGS. 5 and 8 and sensors 72–77 generally shown at 94 in FIGS. 5 and 8, are positioned at the axis of rotation of members 30 and 40 and will sense angular velocities and accelerations of said members 30 and 40 at a pair of axes 62' and 62'', orthogonal to each other and orthogonal to said axis of rotation.

Hence, sensors 62 and 72 will sense angular velocities at a first axis 62' orthogonal to axis of rotation 61' and provide transduced electrical signals due to rotation of members 30 and 40, as inputs to integrator and operational amplifier 85 of electronic means 80.

Sensors 63 and 73 will sense angular velocities at a second axis 62'' which is orthogonal to the first axis and to axis of rotation 61' to provide transduced electrical signals, due to rotation of members 30 and 40, as inputs to operational amplifier 85.

Sensors 64 and 74 will sense angular accelerations at said first axis and provide transduced electrical signals as inputs to operational amplifier 85.

Sensors 65 and 75 will sense angular accelerations at said second axis and provide transduced electrical signals as inputs to operational amplifier 85.

Sensors 66 and 76 will sense linear accelerations with respect to said first axis and provide transduced electrical as inputs to operational amplifier 85.

Sensors 67 and 77 will sense linear accelerations with respect to said second axis and provide transduced electrical signals as inputs to operational amplifier 85.

Amplifier 81 will provide an electrical input at 82 to signal summing and feedback control compensator 87. Likewise, amplifier 83 will provide an electrical input at 84 to control compensator 87. Similarly, integrator and operational amplifier 85 will provide an electrical input at 86 to control compensator 87. Control compensator 87 will, as a result of the aforementioned inputs, provide an electrical output at 88 which when fed back to torque compensator 50 will provide the requisite error correction electrical signals to the torque compensator to control each of the rotational inertia members, as applicable, as above described, and as further detailed in connection with FIGS. 5–9.

Theoretical Analysis

Referring to FIGS. 5, 6, 7, 8 and 9, a schematic representation of the reactionless drive assembly shown therein represents the structure and function, in simple type schematics having optionally alternate structures with respect to coupling points of the torque compensator and the inertia members. In order to derive the appropriate control relationships, the various torques, moments of inertia, angular rates and servo compensation parameters of importance are defined. Although it is a function of the detailed mechanical implementation utilized, in general, disturbance (friction and spring restraint) torques may exist between rotational inertia member 30, base 10, and counter rotational inertia member 40 and base 10, or between inertia rotational member 30 and counter rotational inertia member 40. In addition, inertial disturbance torques may act on either rotational inertia member 30 or on counter rotational inertia member 40. These torques and the other parameters of interest are defined as follows:

Table of Symbols and Definitions

| Symbol | Definitions |
|---|---|
| $J_{30}$ | Moment of Inertia for Rotational Inertia Member 30 |
| $J_{40}$ | Moment of Inertia for Counter Rotational Inertia Member 40 |
| $+T_1$ | Drive Torque Applied to Member 30 by Torque 20 |
| $-T_1$ | Drive Torque Applied to Member 40 by Torquer 20 |
| $+T_2$ | Torque Applied to Member 30 by Torque Compensator 50 |
| $-T_2$ | Torque Applied to Base 10 by Torque Compensator 50 |
| $+T_3$ | Torque Applied to Member 30 due to torque interaction between it and Base 10 |
| $-T_3$ | Reaction Torque at Base 10 due to $+T_3$ |
| $+T_4$ | Torque Applied to Member 40 due to torque interaction between it and Base 10 |
| $-T_4$ | Reaction Torque at Base 10 due to $+T_4$ |
| $+T_5$ | Torque Applied to Member 30 due to torque interaction between it and Member 40 |
| $-T_5$ | Reaction Torque at Member 40 due to $+T_5$ |
| $+T_6$ | Extraneous Inertial Torques Applied to Member 30 |
| $+T_7$ | Extraneous Inertial Torques Applied to Member 40 |
| $+T_8$ | Net Torque Resulting at Base 10 |
| $\omega_{17}$ | Angular Velocity of Member 30 |
| $\omega_{19}$ | Angular Velocity of Member 40 |
| $+V_T$ | Electrical External Torque Command |
| $+V_{6C}$ | Correction Command Electrical Signal to Compensate for $+T_6$ |
| $+V_{7C}$ | Correction Command Signal to Compensate for $+T_7$ |
| $A_{22}$ | Gain Term for Rotational Inertia Member Angular Velocity Signal at 82 |
| $A_{24}$ | Gain Term for Counter Rotational Inertia Member Angular Velocity Signal at 84 |
| $K_1G_1$ | Compensation Control Loop Gain and Servo Compensation at 88 |
| $K_2G_2$ | Inertial Torque Correction Signal Conditioning at 86 |
| $S$ | Laplace Operator |

The compensation control servo is implemented by utilizing measurements of loads due to rotational inertia member 30 and counter rotational inertia member 40 in terms of angular rates sensed by sensors 61 and 71, shown in FIG. 1, to derive a torquing command signal for torque compensator 50. In addition, a servo command signal is also introduced to provide corrections for extraneous inertial torques. A servo block diagram for the reactionless drive is illustrated by FIG. 7 which refers to the structure of FIG. 5.

From this block diagram it can be determined that:

$$T_2 = \left\{ (V_T - T_7 - T_4 + T_5) \left[ \frac{\frac{K_1 G_1 A_{24}}{J_{40} S}}{1 + \frac{K_1 G_1 A_{22}}{J_{30} S}} \right] - (V_T + T_6 + T_3 + T_5) \left[ \frac{\frac{K_1 G_1 A_{22}}{J_{30} S}}{1 + \frac{K_1 G_1 A_{22}}{J_{30} S}} \right] + \right.$$

$$\left. (V_{6C} + V_{7C}) \left[ \frac{K_2 G_2 K_1 G_1}{1 + \frac{K_1 G_1 A_{22}}{J_{30} S}} \right] \right\} \quad (1)$$

and that $$T_8 = -T_2 - T_4 - T_3 \quad (2)$$

$$\omega_{17} = \frac{1}{J_{30} S} (V_T + T_2 + T_6 + T_3 + T_5) \quad (3)$$

$$\omega_{19} = \frac{1}{J_{40} S} (-V_T + T_7 + T_4 - T_5) \quad (4)$$

Furthermore, selecting parameter values as follows:

$$A_{24} = \frac{A_{22} J_{40}}{J_{30}} \quad (5)$$

$$K_2 G_2 = \frac{A_{22}}{J_{30} S} \quad (6)$$

and by generating $V_{6C}$ and $V_{7C}$ such that they compensate for $T_6$ and $T_7$, respectively; the previous relationships reduce to:

$$T_2 = -(T_3 + T_4) \left[ \frac{\frac{K_1 G_1 A_{22}}{J_{30}}}{S + \frac{K_1 G_1 A_{22}}{J_{30}}} \right] \quad (7)$$

$$T_8 = -(T_3 + T_4) \left[ \frac{S}{S + \frac{K_1 G_1 A_{22}}{J_{30}}} \right] \quad (8)$$

$$\omega_{17} = \left\{ \frac{1}{J_{30} S} (V_T + T_6 + T_5) - T_4 \left[ \frac{1}{J_{30} S} \right] \left[ \frac{\frac{K_1 G_1 A_{22}}{J_{30}}}{S + \frac{K_1 G_1 A_{22}}{J_{30}}} \right] + \right.$$

$$\left. T_3 \left[ \frac{1}{J_{30} S} \right] \left[ \frac{S}{S + \frac{K_1 G_1 A_{22}}{J_{30}}} \right] \right\} \quad (9)$$

$$\omega_{19} = \left\{ -\frac{J_{30}}{J_{40}} \omega_{17} + (T_3 + T_4) \left[ \frac{\frac{1}{J_{40}}}{S + \frac{K_1 G_1 A_{22}}{J_{30}}} \right] + \right.$$

$$\left. (T_6 + T_7) \left[ \frac{1}{J_{40} S} \right] \right\} \quad (10)$$

whereas without torque compensator 50 or closed loop 88, $T_2 = 0$, then $$T_8 = -(T_3 + T_4) \quad (11)$$

$$\omega_{17} = \frac{1}{J_{30} S} (V_T + T_6 + T_3 + T_5) \quad (12)$$

-continued $$\omega_{19} = \left[-\frac{J_{30}}{J_{40}}\right]\omega_{17} + (T_3 + T_4 + T_6 + T_7)\left[\frac{1}{J_{40}S}\right] \quad (13)$$

Comparing equations (8) and (11) it is seen that the base disturbance torques are attenuated by compensation control loop 88 as stated. Furthermore, comparing equations (10) and (13) it is also seen that the momentum saturation effects of the $T_3$ and $T_4$ torque terms are also attenuated as stated. The momentum saturation effects of the inertial disturbance torques, $T_6$ and $T_7$, however, are unmodified. It should be noted that by proper mechanical design these terms can be made negligible. for example, if each rotating member is suspended about a principal axis and the moment of inertia values for the other two orthogonal principal axes are equal, the inertial disturbance torques are zero. A further consideration of interest relative to this reactionless drive implementation is that the basic torque input to angular rate output relationships are virtually unchanged by the addition of the compensation control loop 88; see equations (9) and (12). These two relationships differ only in the introduction of the $T_4$ disturbance term and a corresponding attenuation of the $T_3$ disturbance term when the compensation servo loop is closed.

Figure 9:
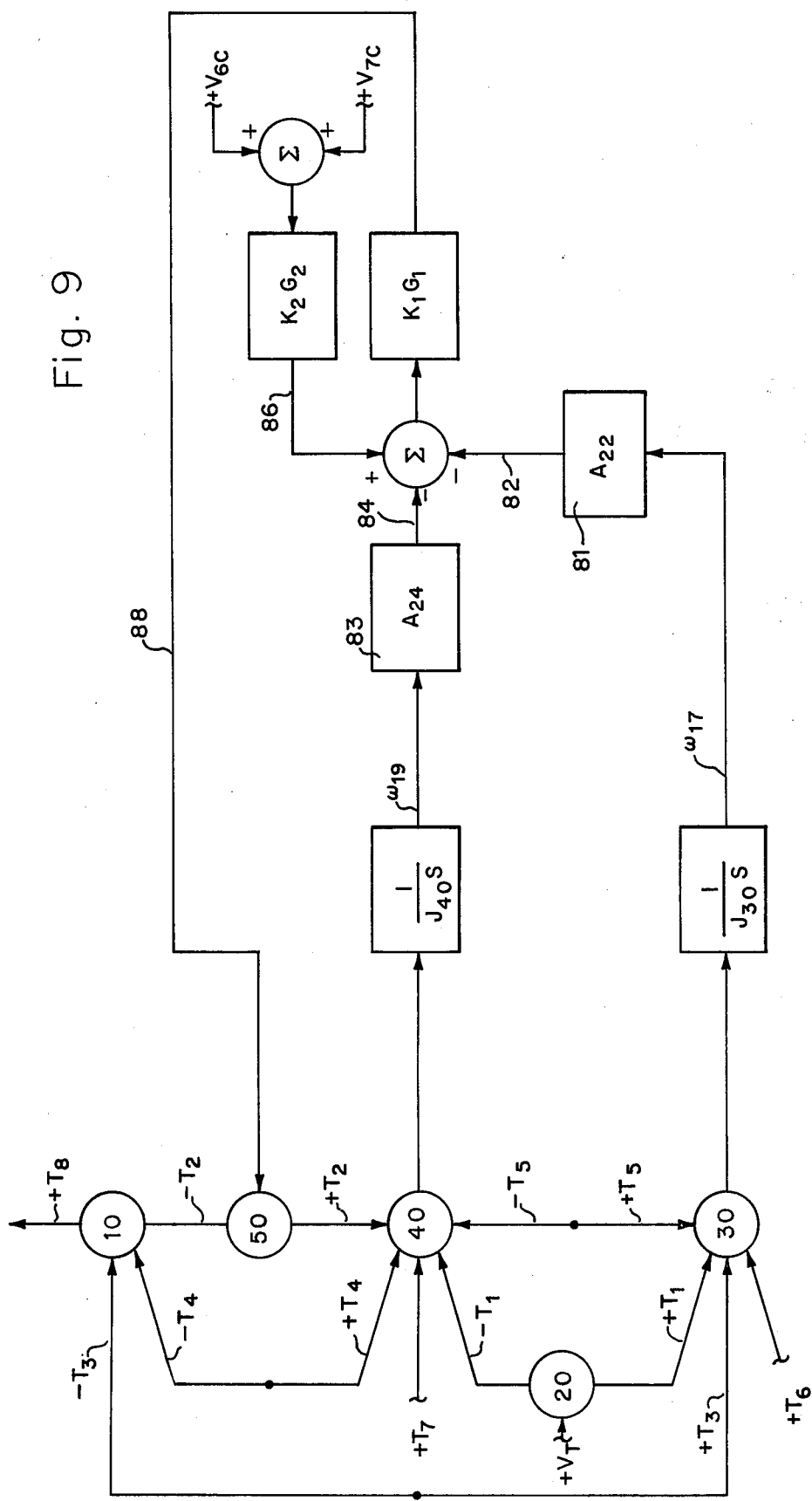
FIG. 9 is a torque schematic of the system of FIG. 8.

Referring to FIGS. 8 and 9, an alternate mechanization of the reactionless drive shown therein is also equally effective. In this case torque compensator 50 is installed such as to act between counter rotational inertia member 40 and base 10, rather than between rotational inertia member 30 and base 10. In this alternate scheme equations (7), (8), and (10) remain unchanged and the relationship for $\omega_{17}$, formerly defined by equation (9) becomes identical to equation (12). All other parameters are the same as stated in connection with FIGS. 5, 6 and 7.

It should be noted that the circle designations in FIGS. 7 and 9 correspond with the components numerically indicated in FIG. 1 and that summation points ⓢ of electrical signals indicate algebraic addition of signals at those points.

Referring to FIGS. 1, 5, 6 and 7, $V_{6C}$ comprises signals from sensors 62–67 and $V_{7C}$ comprises signals from sensors 72–77.

Figure 2:
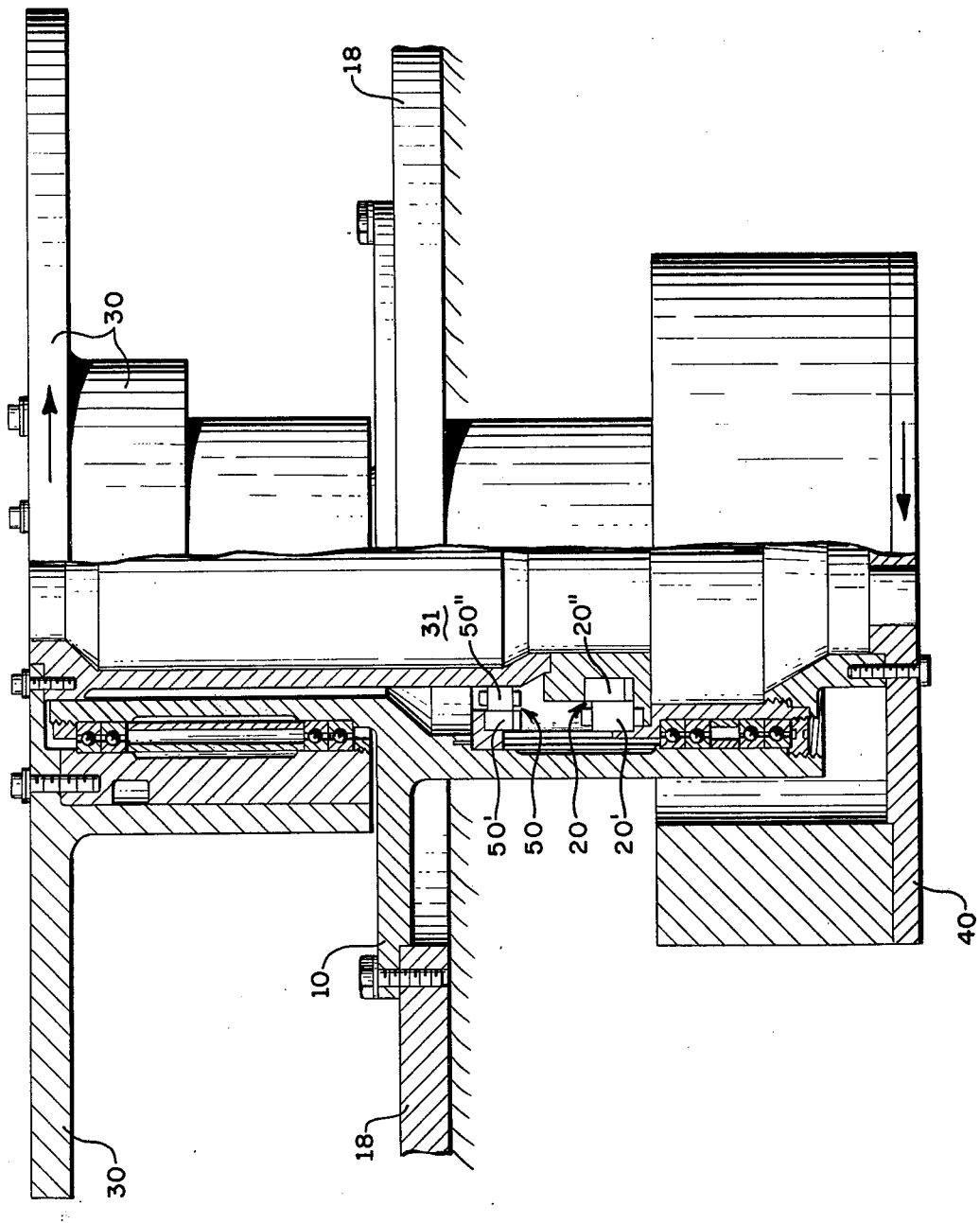
FIG. 2 is a structural view of the reactionless drive system, partially in elevation, and partially in cross-section to afford a view of several of the components of this system.

The basic difference between FIGS. 5 and 8 are in different action of torque compensator 50 upon the inertia members. FIG. 2 structure is represented by mechanical and torque schematics of FIGS. 5 and 7 and in this configuration torque compensation $+T_2$ is imposed upon rotational inertia member 30, whereas in FIGS. 8 and 9 configuration torque compensation $+T_2$ is imposed upon counter rotational inertia member 40.

Referring to FIG. 7 and the Table of Symbols and Definitions and Equations, the torque-electrical relationships of the structure shown in FIGS. 2 and 5 are best depicted by FIG. 7.

Base 10 shows torque $+T_8$ provided to the external structure in which the instant drive is located, which torque is defined by equations (2) or (8), or when no compensation by torque compensator is provided then torque $+T_2 = 0$ and equation (11) defines such torque relationship.

When torque compensator 50 is present, then negative torque $-T_2$ acts upon base 10. In such instance, positive torque $+T_2$, represented by equations (1) or (7) is provided by torque compensator 50 acting upon rotational inertia member 30.

External electrical signals $+V_T$ are provided as input into torquer 20. Torquer 20 provides a positive value of torque $+T_1$ acting upon rotational inertia member 30 and a negative value of torque $-T_1$ acting upon counter rotational inertia member 40.

A torque $+T_6$ provided as an input to the drive is created by disturbances from sources external to the drive, acts upon member 30, and similarly external disturbance created torque $+T_7$ acts upon member 40.

Torques $-T_3$ and $+T_3$ will be present between base 10 and rotational inertia member 30 respectively. Torques $+T_5$ and $-T_5$ will be present between inertia members 30 and 40 respectively. Torques $-T_4$ and $+T_4$ will be present between base 10 and member 40, respectively.

The angular rate of rotational inertia member 30 is inversely proportional to its moment of inertia and is best expressable as a function of Laplace operator S, as $1/J_{30}S$. The angular velocity, $\omega_{17}$, at the axis of rotation of rotational inertia member 30, is therefore shown as a function of $1/J_{30}S$. Parameters comprising such angular velocity are shown by equations (3) or (9), or by equation (12) when compensation due to torque compensator 50 is absent, in which case $+T_2 = 0$.

The angular rate of counter rotational inertia member 40, may be similarly expressed, but as a function of $1/J_{40}S$, and the angular velocity, $\omega_{19}$, at the axis of rotation of member 40 is expressed in terms of equation (4) or (10), or by equation (13) when compensation due to torque compensator 50 is absent, in which case $+T_2 = 0$.

Velocity $\omega_{17}$ is amplified by amplifier 81 which exhibits a gain factor $A_{22}$ at 82. Likewise velocity term is amplified by amplifier 83 exhibiting a gain factor $A_{24}$ at 84. The terms of gain factor $A_{24}$ are best defined by parameters of equation (5).

Correction command electrical signal $V_{6C}$ is algebraically summed with correction command electrical signal $V_{7C}$ and these correction command signals compensate for the extraneous inertial torques applied respectively to members 30 and/or 40. The sum of signals $V_{6C}$ and $V_{7C}$ is used to provide for extraneous inertial torque correction or conditioning, best denoted as parameter $K_2G_2$ and defined by equation (6). Equation (6) describes the output provided by integrator and operational amplifier 85 as provided at 86.

Algebraic sum of the signals at 82, 84 and 86 is shown as an input to signal summing and feedback control compensator 87, denoted herein as $K_1G_1$ to provide compensation of control loop gain and servo compensation at 88 as an input to torque compensator 50 to provide the requisite corrections as hereinabove described.

Referring to FIG. 9, which is the torque-electrical schematic representation of the alternate structure as shown in FIG. 8, the difference between FIGS. 9 and 7, is that in FIG. 9, torque $+T_2$ provided by torque compensator acts upon counter rotational inertia member 40, instead of upon rotational inertia member 30 as in FIG. 7. In all other respects the description of operation would be identical to that provided in connection with FIG. 7 above, and need not be repeated.

What is claimed is:

1. In a substantially reactionless drive, supported by a base, having a torquer responsive to external electrical signals, a single degree of freedom rotational inertia member coupled to the torquer, and a single degree of freedom counter rotational inertia member coupled to the torquer and driven in a direction opposite to said rotational inertia member during operative mode of said drive, the improvement comprising in combination:

an elongated extension, integral with and perpendicular to the rotational inertia members positioned at the axis of rotation and coupled to the torquer;

a torque compensator comprising an electric motor coupling the base with the extension;

electronic means, the output of which is connected to the torque compensator; and transducing means, comprising first transducers positioned at the periphery of the inertia members and second transducers positioned at the axis of rotation, coupling the rotational inertia members to the electronic means, said electronic means including a torque compensation loop electrically interlinking the rotational member, the counter rotational member and the torque compensator so as to feed back an electrical error correcting signal supplied by said transducers to the torque compensator, during operative mode of said drive.

2. The invention as stated in claim 1, wherein the torque compensator comprises rotor and stator members, said rotor being coupled to said extension and said stator being attached to said base.

3. The invention as stated in claim 2, wherein said transducing and electronic means enable maintenance of a torque by the torque compensator acting on the base in opposite direction to a substantially equal torque acting on the rotational inertia member for maintaining the total angular momentum of said drive during said operative mode to a value of substantially zero.

4. The invention as stated in claim 2, wherein said transducing means comprises:

first sensing means peripherally coupled to said inertia members for measuring angular velocities of said inertia members at said axis of rotation; and second sensing means, coupled to said inertia members at said axis rotation, for measuring angular velocities of said inertia members at a pair of axes which are orthogonal to each other and orthogonal to said axis of rotation, for measuring angular acceleration of said inertia members at said axes, or for measuring linear acceleration of said inertia members with respect to said axes.

5. The invention as stated in claim 2, wherein said electronic means comprises:

amplifying and integration means connected to the transducing means; and signal summing and feedback control compensating means, responsive to electrical signal inputs from said amplifying and integration means, for providing said error correction signals.

6. The invention as stated in claim 2, wherein said torquer comprises rotor and stator members, said rotor being coupled to said extension and driving same in a first direction during said operative mode, and said stator being coupled to and rotating with said counter rotational inertia member in a second direction opposite to said first direction during said operative mode.

7. The invention as stated in claim 1, wherein the torque compensator comprises rotor and stator members, said rotor being coupled to the counter rotational inertia member and said stator being attached to the base.

8. The invention as stated in claim 7, wherein said transducing and electronic means enable maintenance of a torque by the torque compensator acting on the base in opposite direction to a substantially equal torque acting on the counter rotational inertia member for maintaining the total angular momentum of said drive during said operative mode to a value of substantially zero.

9. The invention as stated in claim 7, wherein said transducing means comprises:

first sensing means peripherally coupled to said inertia members for measuring angular velocities of said inertia members at said axis of rotation; and second sensing means, coupled to said inertia members at said axis of rotation, for measuring angular velocities of said inertia members at a pair of axes which are orthogonal to each other and orthogonal to said axis of rotation, for measuring angular acceleration of said inertia members at said axes, or for measuring linear acceleration of said inertia members with respect to said axes.

10. The invention as stated in claim 7, wherein said electronic means comprises:

amplifying and integration means connected to the transducing means; and signal summing and feedback control compensating means, responsive to electrical signal inputs from said amplifying and integration means, for providing said error correction signals.

11. The invention as stated in claim 7, wherein said torquer comprises rotor and stator members, said rotor being coupled to said extension and driving same in a first direction during said operative mode, and said stator being coupled to and rotating with said counter rotational inertia member in a second direction opposite to said first direction during said operative mode.

* * * * *